106. COMPOSITIONS, COATING OR PLASTIC.

Patented Sept. 8, 1936

2,053,842

UNITED STATES PATENT OFFICE 2,053,842

CELLULAR CEMENT AND A PROCESS FOR MAKING THE SAME

John A. Rice, Berkeley, Calif., assignor to The Bubblestone Company, Pittsburgh, Pa., a corporation of Pennsylvania No Drawing. Application December 21, 1922, Serial No. 608,349

10 Claims. (Cl. 106—24)

The present invention relates to improvements in plastic compositions and its particular object is to provide a cellular composition adapted to be used for walls, constructional purposes, fireproofing of the frame work of steel buildings and practically all purposes that concrete can be used for and that is not only considerably lighter in weight than the concrete mixtures now commonly used but contains a large number of cellular voids adapted to improve the heat insulating qualities of the material. The invention consists principally in a method of impregnating cement while in a dry or soft state with gas bubbles preferably produced by whipping a gelatinous substance in the presence of water into a foam or lather. The bubbles thus formed mix readily with the cement and occupy space within the same and in this respect may be described as taking the place of gravel or rock now commonly used in the mixing of concrete in addition to sand. My mixture would preferably comprise suitable proportions of Portland cement, sand and foam although of course gravel may be added if desired. In referring to cement or Portland cement I wish to state that this expression is intended to include clay, magnesite, plaster of Paris, kieselguhr and similar materials.

The preferred form in which the principle of my invention may be executed will be described in the following specification but it should be remembered that various changes or modifications may be made within the scope of the claims hereto attached without departing from the spirit of the invention.

My invention comprises principally a mixture of Portland cement and gas bubbles. The Portland cement or clay or magnesite or any other equivalent is preferably mixed with sand either in the presence of water or in a dry state. The gas bubbles are preferably produced by whipping a gelatinous mixture of preferably the following proportions:

|  | Per cent |
|---|---|
| Glue | 1 |
| Water | 98⅔ |
| Formalin (containing 40% formaldehyde) | ⅓ of 1 |

Before whipping, this mixture is allowed to age for twenty-four hours or longer and is then whipped into a stiff foam or lather which will remain stable for a considerable length of time. This foam is mixed in suitable proportions with the cement mixture or with powdered cement material which process results in the gas bubbles of the foam being thoroughly and more or less homogeneously incorporated in the cement mixture. The bubbles remain until the cement is set and produce thereby a stable body with a large number of cellular voids therein.

I have discovered that glue or gelatine, a solution of Irish moss, silicic acid gel, and many other kinds of gel may be used to make the foam or lather. A celluloid solution might be used to make a lather that is entirely proof against water and that would have great strength.

Another method and means of manufacturing concrete having included voids similar to those formed by gas bubbles consists in adding to the concrete or cement varying proportions of stiff gel divided into particles of a desired size by being forced through a sieve or in any other suitable manner. The gel which I have used for this purpose consists of gelatine and water made waterproof by the addition of formalin. After setting, the concrete should be dried and the voids left by the gelatine will contain only a small residue. By the use of the limitation "stiff" when referring to the foam, I wish it to be understood that the limitation is intended to designate a tenacious foam or such a foam that the thin films forming the bubbles are sufficiently strong to be maintained when mixed with a cement.

I claim:

1. The process of producing a cellular cement which comprises whipping a mixture of 1 percent of glue, 98⅔ percent of water and ⅓ of 1 percent formalin into a stiff foam, for creating bubbles and stirring the foam into a cement.

2. The process of producing a cellular cement which comprises whipping a mixture of glue, water and formalin into a stiff foam to form gas bubbles and stirring the foam into a cement.

3. The process of producing a cellular cement which comprises whipping a protein, water and formalin into a stiff foam to form gas bubbles and stirring the foam into a cement.

4. The process of producing a cellular cement which comprises whipping a protein, an indurating agent and water into a stiff foam to form gas bubbles and stirring the bubbles into a cement.

5. A composition of matter comprising a mixture of gas bubbles formed of whipped protein, water and formalin and a cement.

6. A composition of matter comprising a mixture of 1 percent of glue, 98 percent of water and ⅕ of 1 percent formalin whipped into a foamy consistency and cement.

7. The process of producing a cellular cement which comprises whipping a mixture of a solution of Irish moss, water and formalin into a stiff foam to form gas bubbles and stirring the foam into a cement.

8. The process of producing a cellular cement which comprises whipping a mixture of a celluloid solution and water into a stiff foam to form gas bubbles and stirring the foam into a cement.

9. A cellular composition consisting of plastic clay mixed with a foam formed by beating a protein, water and formalin.

10. A cellular composition consisting of plastic clay mixed with a foam formed by beating 1% glue, 98⅘% water and ⅕ of 1% formalin.

JOHN A. RICE.